United States Patent
Robertson, Jr. et al.

(10) Patent No.: US 11,247,644 B2
(45) Date of Patent: Feb. 15, 2022

(54) VEHICLE SENSOR CLEANING WITH ADDITIVES

(71) Applicant: Ford Global Technologies, LLC, Dearborn, MI (US)

(72) Inventors: Michael Robertson, Jr., Livonia, MI (US); Tyler D. Hamilton, Farmington, MI (US); Ashwin Arunmozhi, Canton, MI (US); Venkatesh Krishnan, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 206 days.

(21) Appl. No.: 16/556,451

(22) Filed: Aug. 30, 2019

(65) Prior Publication Data

US 2021/0061233 A1 Mar. 4, 2021

(51) Int. Cl.

| | |
|---|---|
| *B60S 1/52* | (2006.01) |
| *B05B 1/30* | (2006.01) |
| *G05D 7/06* | (2006.01) |
| *G01L 5/00* | (2006.01) |
| *G01N 21/958* | (2006.01) |
| *B08B 3/02* | (2006.01) |

(Continued)

(52) U.S. Cl.
CPC ............. *B60S 1/52* (2013.01); *B05B 1/30* (2013.01); *B08B 3/02* (2013.01); *B60S 1/50* (2013.01); *G01L 5/0052* (2013.01); *G01N 21/958* (2013.01); *G05D 7/0641* (2013.01); *G05D 1/027* (2013.01); *G05D 1/0231* (2013.01); *G05D 1/0257* (2013.01); *G05D 1/0278* (2013.01)

(58) Field of Classification Search
CPC .... B60S 1/52; B60S 1/50; B60S 1/481; B60S 1/56; B05B 1/30; G05D 7/0641; G05D 1/0257; G05D 1/0278; G05D 1/027; G05D 1/0231; G01L 5/0052; G01N 21/958; G01N 2021/945; G01N 21/94; G01N 2021/155; G01N 21/15; B08B 3/02; G02B 27/0006
See application file for complete search history.

(56) References Cited

U.S. PATENT DOCUMENTS

| | | |
|---|---|---|
| 10,093,284 B2 | 10/2018 | Hsiao et al. |
| 10,272,886 B2 | 4/2019 | Baldovino et al. |

(Continued)

FOREIGN PATENT DOCUMENTS

EP  1149746 A2  10/2001

*Primary Examiner* — Charles R Kasenge
(74) *Attorney, Agent, or Firm* — Frank A. MacKenzie; Bejin Bieneman PLC

(57) ABSTRACT

A sensor system includes a sensor including a sensor window; a nozzle aimed at the sensor window; a supply line to supply fluid to the nozzle; a primary reservoir to supply fluid to the supply line; a first valve actuatable to inject fluid from a first reservoir into the supply line; a second valve actuatable to inject fluid from a second reservoir into the supply line; a third valve actuatable to inject fluid from a third reservoir into the supply line; and a computer communicatively coupled to the sensor and the valves. The computer is programmed to actuate the first valve in response to determining a first condition based on data from the sensor, actuate the second valve in response to determining a second condition based on data from the sensor, and actuate the third valve in response to determining a third condition based on data from the sensor.

19 Claims, 4 Drawing Sheets

(51) Int. Cl.
  *B60S 1/50* (2006.01)
  *G05D 1/02* (2020.01)

(56) References Cited

U.S. PATENT DOCUMENTS

| | | | |
|---|---|---|---|
| 10,286,880 B2 | 5/2019 | Schmidt et al. | |
| 10,437,012 B1* | 10/2019 | Gurin | G02B 13/001 |
| 10,442,402 B2* | 10/2019 | Schmidt | B60S 1/0888 |
| 10,703,341 B2* | 7/2020 | Kunze | B60S 1/56 |
| 10,735,716 B2* | 8/2020 | Herman | H04N 5/2256 |
| 10,744,979 B2* | 8/2020 | Schmidt | G01S 7/4813 |
| 2011/0266375 A1* | 11/2011 | Ono | B60S 1/54 |
| | | | 239/589 |
| 2013/0010115 A1* | 1/2013 | Jerusalem | B60S 1/56 |
| | | | 348/148 |
| 2013/0037627 A1* | 2/2013 | Kikuta | B60S 1/583 |
| | | | 239/284.1 |
| 2013/0146577 A1* | 6/2013 | Haig | B60H 1/0025 |
| | | | 219/202 |
| 2013/0319486 A1* | 12/2013 | Kikuta | B60S 1/56 |
| | | | 134/123 |
| 2014/0007909 A1* | 1/2014 | Manaois | B05B 7/267 |
| | | | 134/18 |
| 2015/0353024 A1* | 12/2015 | Cooper | B60R 11/04 |
| | | | 348/148 |
| 2017/0210351 A1* | 7/2017 | Ghannam | B60S 1/50 |
| 2018/0141522 A1* | 5/2018 | Satarino | B60S 1/481 |
| 2018/0251099 A1* | 9/2018 | Satarino | B60S 1/481 |
| 2018/0272999 A1* | 9/2018 | Giraud | B60S 1/481 |
| 2018/0288288 A1* | 10/2018 | Romack | H04N 5/2171 |
| 2018/0290632 A1 | 10/2018 | Rice et al. | |
| 2018/0353446 A1 | 12/2018 | Krishnan | |
| 2019/0099768 A1* | 4/2019 | Romack | B60S 1/48 |
| 2019/0135239 A1 | 5/2019 | Rice | |
| 2019/0299939 A1* | 10/2019 | Davies | B05B 9/04 |
| 2020/0001331 A1* | 1/2020 | Deane | B08B 3/02 |
| 2020/0139939 A1* | 5/2020 | Kubota | B60S 1/52 |
| 2020/0189530 A1* | 6/2020 | Kubota | F16K 27/029 |
| 2020/0207312 A1* | 7/2020 | Kamiya | G06K 9/00362 |
| 2021/0060585 A1* | 3/2021 | Romack | B05B 1/3006 |

\* cited by examiner

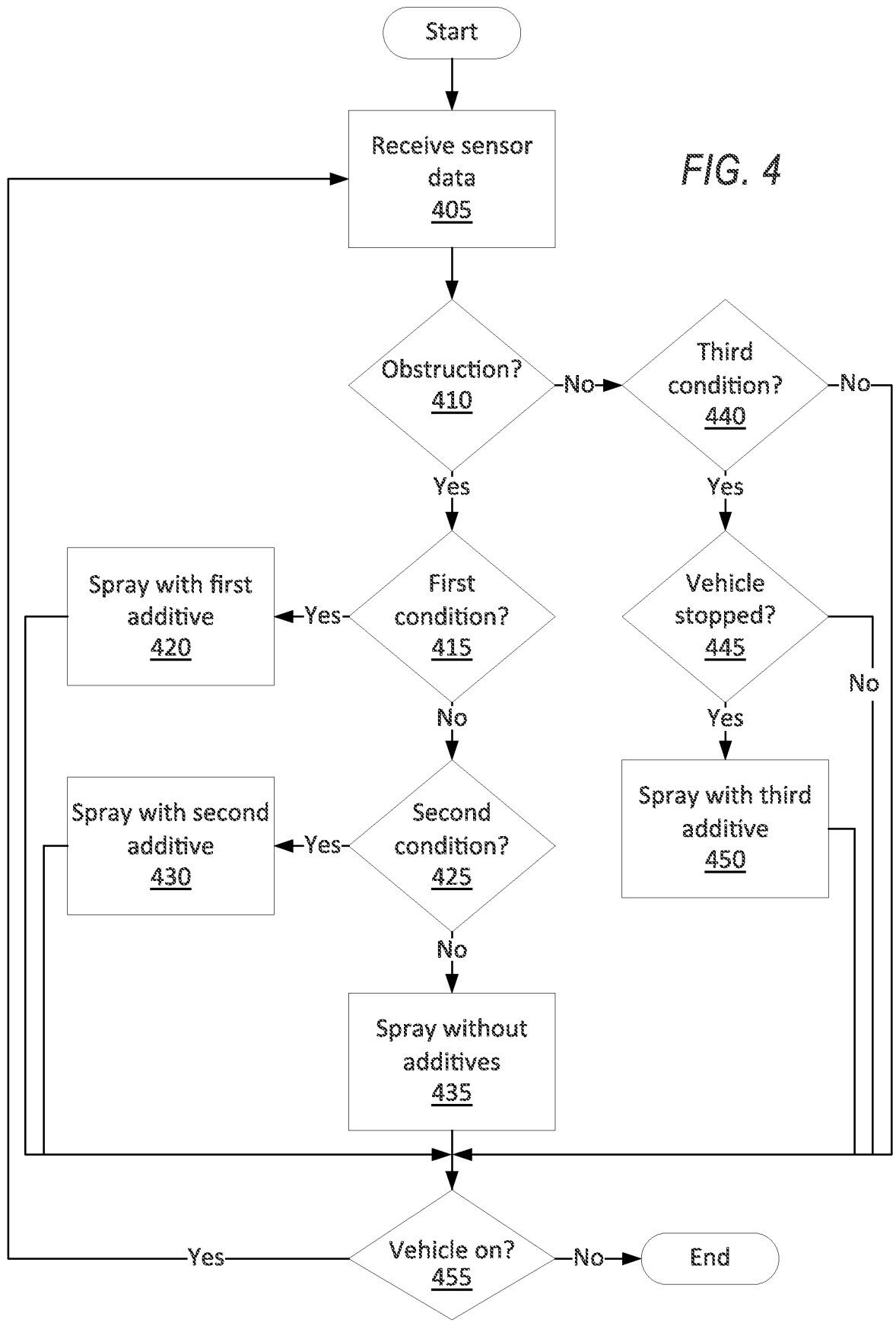

VEHICLE SENSOR CLEANING WITH ADDITIVES

BACKGROUND

Vehicles, such as autonomous or semi-autonomous vehicles, typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices. Sensor operation can be affected by obstructions, e.g., dust, snow, insects, etc., as well as by degradation of features of the sensor window or lens caused by the environment.

BRIEF DESCRIPTION OF THE DRAWINGS

FIG. 4 is a process flow diagram of an example process for cleaning the sensor assembly.

DETAILED DESCRIPTION

Figure 1:
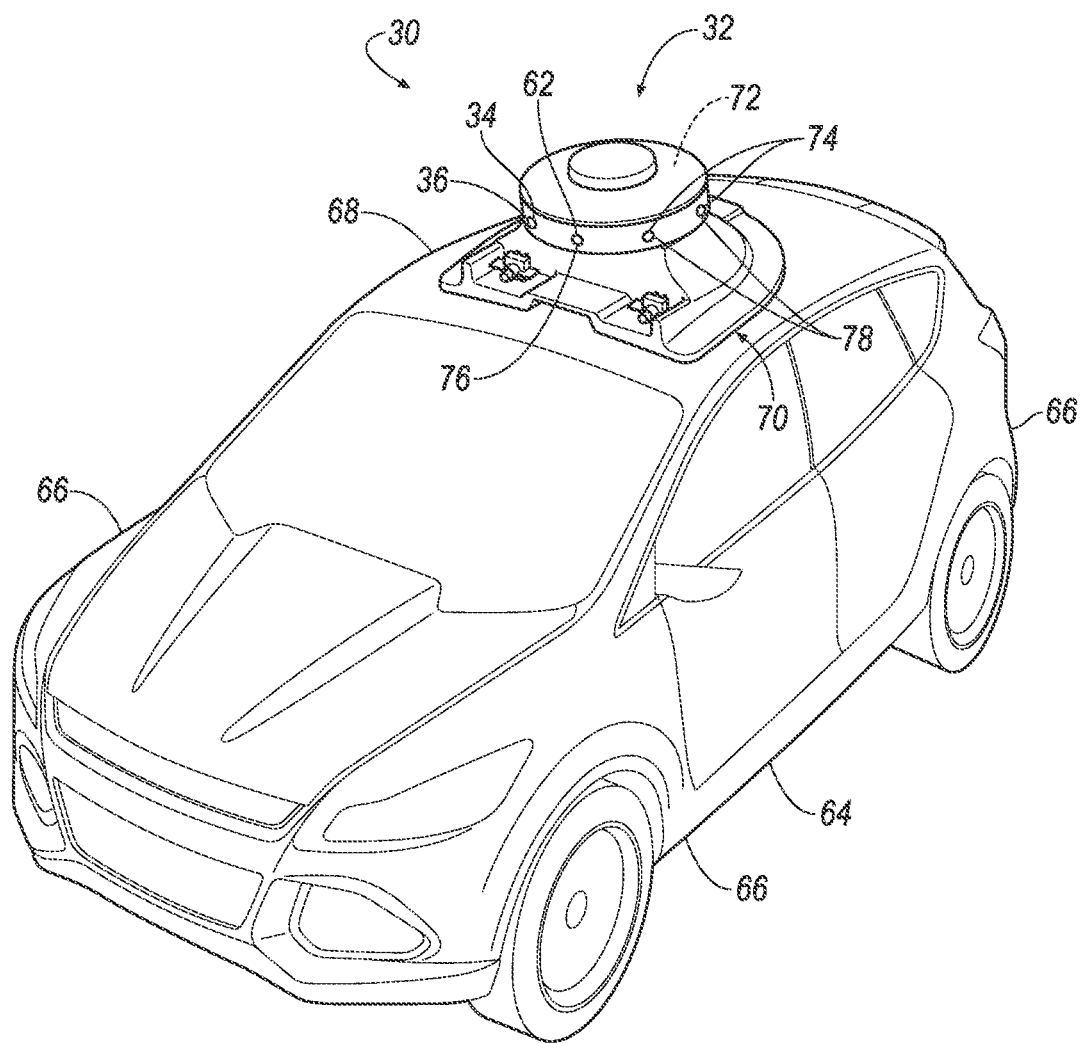
FIG. 1 is a perspective view of an example vehicle including a sensor assembly.

A sensor system includes a sensor including a sensor window; a nozzle aimed at the sensor window; a supply line positioned to supply fluid to the nozzle; a primary reservoir positioned to supply fluid to the supply line; a first reservoir, a second reservoir, and a third reservoir, all fixed relative to the primary reservoir; a first valve actuatable to inject fluid from the first reservoir into the supply line; a second valve actuatable to inject fluid from the second reservoir into the supply line; a third valve actuatable to inject fluid from the third reservoir into the supply line; and a computer communicatively coupled to the sensor and the valves, wherein the computer is programmed to actuate the first valve in response to determining a first condition based on data from the sensor; actuate the second valve in response to determining a second condition based on data from the sensor; and actuate the third valve in response to determining a third condition based on data from the sensor.

The valves may be solenoid valves.

The first condition may be an impact to the sensor window by an insect.

The first condition may be a presence of an insect on the sensor window after washing the sensor window without actuating the first valve.

The second condition may be ice buildup on the sensor window.

The third condition may be a loss of hydrophobic coating on the sensor window.

The third condition may be both a vehicle including the sensor coming to a stop and a loss of hydrophobic coating on the sensor window.

The sensor may be a first sensor; the sensor window may be a first sensor window; and the nozzle may be a first nozzle. The sensor system may further include a second sensor including a second sensor window; a second nozzle aimed at the second sensor window; and a manifold fluidly connected to the supply line, to the first nozzle, and to the second nozzle. The manifold may include manifold valves independently operable to output fluid from the supply line respectively to the first nozzle and to the second nozzle. The computer may be further programmed to, in response to determining the first condition based on data from the second sensor, actuate the manifold valves to route fluid to the second nozzle and actuate the first valve; in response to determining the second condition based on data from the second sensor, actuate the manifold valves to route fluid to the second nozzle and actuate the second valve; and in response to determining the third condition based on data from the second sensor, actuate the manifold valves to route fluid to the second nozzle and actuate the third valve.

A computer includes a processor and a memory storing instructions executable by the processor to actuate a first valve to inject a first additive to fluid supplied to a sensor window in response to determining a first condition based on data from a sensor including the sensor window; actuate a second valve to inject a second additive to the fluid in response to determining a second condition based on data from the sensor; and actuate a third valve to inject a third additive to the fluid in response to determining a third condition based on data from the sensor.

The first condition may be an impact to the sensor window by an insect.

The first condition may be a presence of an insect on the sensor window after washing the sensor window without actuating the first valve.

The second condition may be ice buildup on the sensor window.

The third condition may be a loss of hydrophobic coating on the sensor window.

The third condition may be both a vehicle including the sensor coming to a stop and a loss of hydrophobic coating on the sensor window.

A sensor system includes a sensor including a sensor window; means for cleaning the sensor window with fluid; means for injecting a first additive into the fluid in response to determining a first condition based on data from the sensor; means for injecting a second additive into the fluid in response to determining a second condition based on data from the sensor; and means for injecting a third additive into the fluid in response to determining a third condition based on data from the sensor.

The sensor may be a first sensor, and the sensor window may be a first sensor window. The sensor system may further include a second sensor including a second sensor window, and means to selectively direct the fluid to the first sensor window or the second sensor window.

With reference to the Figures, a sensor system 32 for a vehicle 30 includes a first sensor 34 including a first sensor window 36; a first nozzle 38 aimed at the first sensor window 36; at least one supply line 40, 42, 44 positioned to supply fluid to the first nozzle 38; a primary reservoir 46 positioned to supply fluid to the supply line 40, 42, 44; a first reservoir 48, a second reservoir 50, and a third reservoir 52, all fixed relative to the primary reservoir 46; a first valve 54 actuatable to inject fluid from the first reservoir 48 into the supply line 40, 42, 44; a second valve 56 actuatable to inject fluid from the second reservoir 50 into the supply line 40, 42, 44; a third valve 58 actuatable to inject fluid from the third reservoir 52 into the supply line 40, 42, 44; and a computer 60 communicatively coupled to the first sensor 34 and the valves. The computer 60 is programmed to actuate the first valve 54 in response to determining a first condition based on data from the first sensor 34, actuate the second valve 56 in response to determining a second condition based on data from the first sensor 34, and actuate the third valve 58 in response to determining a third condition based on data from the first sensor 34.

The sensor system 32 can help clean the first sensor window 36 in adverse environments, such as particularly buggy environments or cold environments, by providing appropriate additives that can be mixed into washer fluid. The additives can be efficiently deployed by being used only when the first, second, or third condition is satisfied. The sensor system 32 can provide an efficient way to replenish hydrophobic coating on the first sensor window 36 without servicing the vehicle 30.

With reference to FIG. 1, the vehicle 30 may be any passenger or commercial automobile such as a car, a truck, a sport utility vehicle, a crossover, a van, a minivan, a taxi, a bus, etc.

The vehicle 30 may be an autonomous vehicle. A vehicle computer can be programmed to operate the vehicle 30 independently of the intervention of a human driver, completely or to a lesser degree. The vehicle computer may be programmed to operate the propulsion, brake system, steering, and/or other vehicle systems based at least in part on data received from the first sensor 34, a second sensor 62, additional sensors 74, and other sensors. For the purposes of this disclosure, autonomous operation means the vehicle computer controls the propulsion, brake system, and steering without input from a human driver; semi-autonomous operation means the vehicle computer controls one or two of the propulsion, brake system, and steering and a human driver controls the remainder; and nonautonomous operation means a human driver controls the propulsion, brake system, and steering.

The vehicle 30 includes a body 64. The vehicle 30 may be of a unibody construction, in which a frame and the body 64 of the vehicle 30 are a single component. The vehicle 30 may, alternatively, be of a body-on-frame construction, in which the frame supports the body 64 that is a separate component from the frame. The frame and body 64 may be formed of any suitable material, for example, steel, aluminum, etc.

The body 64 includes body panels 66 partially defining an exterior of the vehicle 30. The body panels 66 may present a class-A surface, e.g., a finished surface exposed to view by a customer and free of unaesthetic blemishes and defects. The body panels 66 include, e.g., a roof 68, etc.

A housing 70 for the sensors 34, 62, 74 is attachable to the vehicle 30, e.g., to one of the body panels 66 of the vehicle 30, e.g., the roof 68. For example, the housing 70 may be shaped to be attachable to the roof 68, e.g., may have a shape matching a contour of the roof 68. The housing 70 may be attached to the roof 68, which can provide the sensors 34, 62, 74 with an unobstructed field of view of an area around the vehicle 30. The housing 70 may be formed of, e.g., plastic or metal.

The housing 70 may enclose and define a cavity 72. One or more of the body panels 66, e.g., the roof 68, may partially define the cavity 72, or the housing 70 may fully enclose the cavity 72. The housing 70 may shield contents of the cavity 72 from external elements such as wind, rain, debris, etc.

The sensors 34, 62, 74 are disposed in the cavity 72 of the housing 70. The sensors 34, 62, 74 include the first sensor 34, the second sensor 62, and possibly the additional sensors 74. The sensors 34, 62, 74 may detect the location and/or orientation of the vehicle 30. For example, the sensors 34, 62, 74 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 34, 62, 74 may detect the external world, e.g., objects and/or characteristics of surroundings of the vehicle 30, such as other vehicles, road lane markings, traffic lights and/or signs, pedestrians, etc. For example, the sensors 34, 62, 74 may include radar sensors, scanning laser range finders, light detection and ranging (LIDAR) devices, and image processing sensors such as cameras. The sensors 34, 62, 74 may include communications devices, for example, vehicle-to-infrastructure (V2I) or vehicle-to-vehicle (V2V) devices.

The first sensor 34 includes the first sensor window 36, and the second sensor 62 includes a second sensor window 76, and the additional sensors 74 can include respective additional sensor windows 78. The sensor windows 36, 76, 78 protect the respective sensors 34, 62, 74 from the ambient environment. The sensor windows 36, 76, 78 provide a field of view for each of the sensors 34, 62, 74 through the housing 70. The sensor windows 36, 76, 78 are transparent at least to a wavelength of light to which the respective sensors 34, 62, 74 are sensitive.

The sensor windows 36, 76, 78 can include a hydrophobic coating, e.g., a superhydrophobic coating or a standard hydrophobic coating. The hydrophobic coating repulses liquid, such as water, from the surfaces of the sensor windows 36, 76, 78. In other words, the hydrophobic coating provides an increased repulsion of liquid as compared to a surface without the hydrophobic coating. In other words, a variation of surface energy between a surface with and without hydrophobic coating affects an amount of contact area between a liquid droplet and the surface as well as an overall three-dimensional shape of the liquid droplet. The hydrophobic coating aids in maintaining cleanliness of the sensor windows 36, 76, 78. For example, dirt, residue, and other contaminants may be removed more easily, e.g., with less time and/or amount of cleaning fluid, from the sensor windows 36, 76, 78 having the hydrophobic coating. The hydrophobic coating is a thin layer, e.g., 200-300 nanometers, of hydrophobic material that extends along the surface of each sensor window. Example hydrophobic materials include manganese oxide polystyrene (MnO2/PS) nanocomposite, zinc oxide polystyrene (ZnO/PS) nanocomposite, precipitated calcium carbonate, carbon nanotube structures, silica nanocoating, fluorinated silanes, and fluoropolymer coatings.

Figure 2:
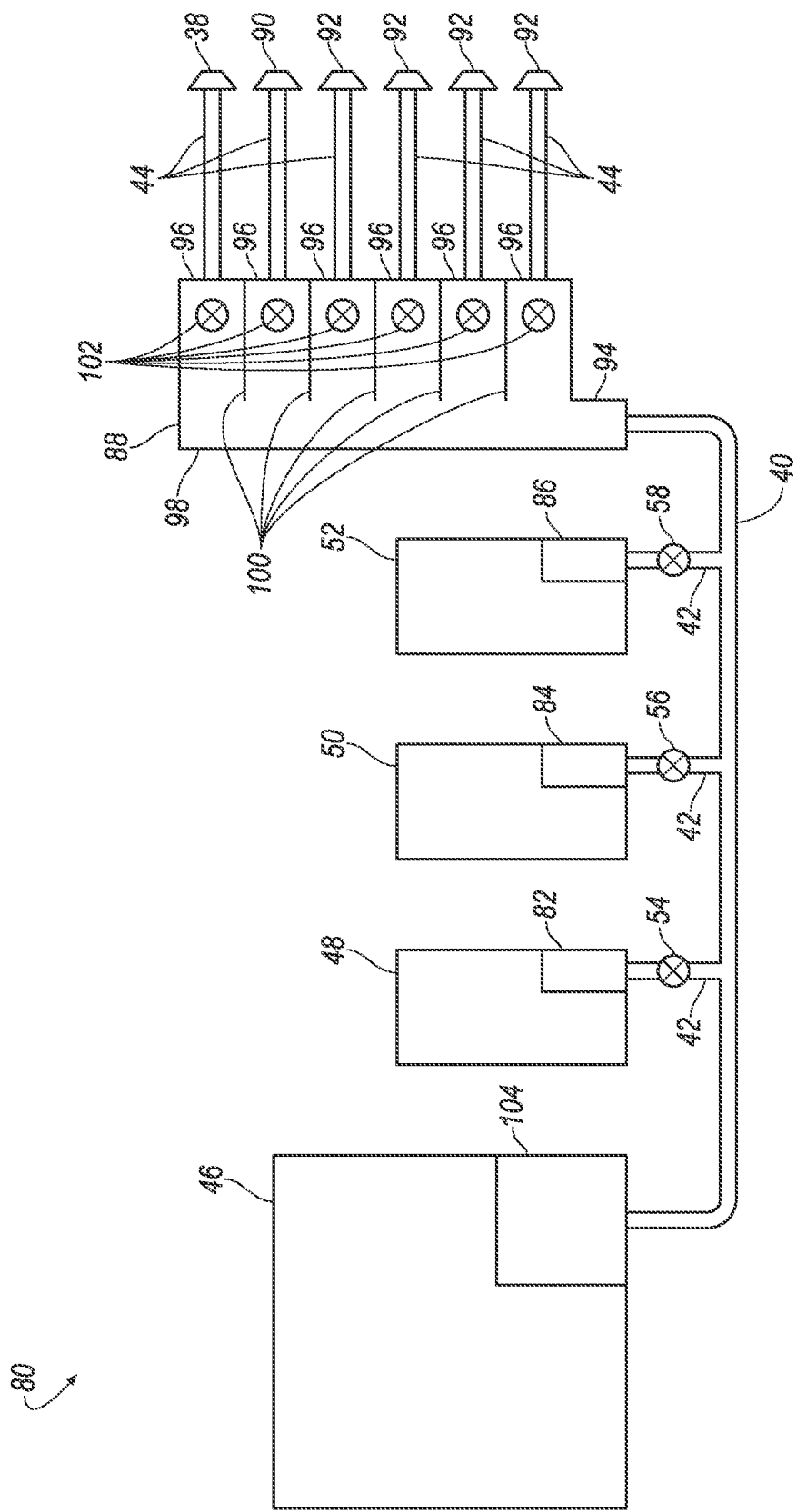
FIG. 2 is a diagram of a cleaning system for the sensor assembly.

With reference to FIG. 2, a cleaning system 80 of the vehicle 30 includes the primary reservoir 46, a primary pump 104, the first reservoir 48, the second reservoir 50, the third reservoir 52, a first pump 82, a second pump 84, a third pump 86, the supply lines 40, 42, 44, a manifold 88, the first valve 54, the second valve 56, the third valve 58, and nozzles 38, 90, 92 including the first nozzle 38, a second nozzle 90, and additional nozzles 92. The primary reservoir 46 and the primary pump 104, along with the first reservoir 48 and first pump 82, the second reservoir 50 and second pump 84, and the third reservoir 52 and third pump 86, are fluidly connected to the nozzles 38, 90, 92 (i.e., fluid can flow from one to the other) via the supply lines 40, 42, 44 and the manifold 88. The cleaning system 80 distributes washer fluid stored in the primary reservoir 46 to the nozzles 38, 90, 92, along with possibly additives stored in the first reservoir 48, second reservoir 50, or third reservoir 52, as described below. "Washer fluid" refers to any liquid stored in the primary reservoir 46 for cleaning. The washer fluid may include solvents, detergents, diluents such as water, etc.

The primary reservoir 46 is a tank fillable with liquid, e.g., washer fluid for window cleaning. The primary reservoir 46 may be disposed in a front of the vehicle 30, specifically, in an engine compartment forward of a passenger cabin. The primary reservoir 46 may store the washer fluid only for supplying the sensors 34, 62, 74 or also for other purposes, such as supply to a windshield. Alternatively, the primary reservoir 46 may be disposed in the cavity 72 of the housing 70. In either location, the primary reservoir 46 is positioned to supply fluid to the supply lines 40, 42, 44.

The primary pump 104 can force the washer fluid through the supply lines 40, 42, 44 and the manifold 88 to the nozzles 38, 90, 92 with sufficient pressure that the washer fluid sprays from the nozzles 38, 90, 92. The primary pump 104 is fluidly connected to the primary reservoir 46. The primary pump 104 may be attached to or disposed in the primary reservoir 46. The primary pump 104 is fluidly connected to the manifold 88, specifically to an inlet 94 of the manifold 88.

The supply lines 40, 42, 44 are positioned to supply fluid to the nozzle 38, 90, 92. The supply lines 40, 42, 44 include a primary supply line 40, additive supply lines 42, and nozzle supply lines 44. The supply lines 40, 42, 44 extend from the primary pump 104, the first pump 82, the second pump 84, and the third pump 86 to the manifold 88 (i.e., to the inlet 94 of the manifold 88) and from the manifold 88 (i.e., outlets 96 of the manifold 88) to the nozzles 38, 90, 92. Specifically, the primary supply line 40 extends from the primary pump 104 to the manifold 88; the additive supply lines 42 each extend from one of the first pump 82, the second pump 84, or the third pump 86 to the primary supply line 40; and the nozzle supply lines 44 each extend from the manifold 88 to one of the nozzles 38, 90, 92. The supply lines 40, 42, 44 may be, e.g., flexible tubes.

The manifold 88 includes the inlet 94, a pipe 98, a plurality of tubes 100, and the outlets 96. The inlet 94 receives washer fluid from the primary pump 104 via the supply lines 40, 42, 44, from which the washer fluid passes through the pipe 98 to the tubes 100, and from each tube 100 exits the manifold 88 through one of the outlets 96. The manifold 88 includes a plurality of manifold valves 102, and one manifold valve 102 is located in each tube 100. The manifold valves 102 can be, e.g., solenoid valves. The manifold 88 can direct washer fluid entering the inlet 94 to any combination of tubes 100, i.e., can independently block or open each of the tubes 100 by independently opening or closing each of the manifold valves 102. The manifold 88 can be disposed in the cavity 72 of the housing 70 and fixed relative to the housing 70.

The nozzles 38, 90, 92 include the first nozzle 38, the second nozzle 90, and the additional nozzles 92. Each of the nozzles 38, 90, 92 is fluidly connected to one of the tubes 100 via one of the nozzle supply lines 44. The manifold valves 102 are independently operable to output fluid received in the manifold 88 from the primary supply line 40 to the respective nozzle supply lines 44 and thus to the respective nozzles 38, 90, 92. The nozzles 38, 90, 92 are positioned to eject the washing fluid to clear obstructions from the fields of view of the sensors 34, 62, 74, e.g., aimed at the sensor windows 36, 76, 78. The first nozzle 38 is aimed at the first sensor window 36, the second nozzle 90 is aimed at the second sensor window 76, and the additional nozzles 92 are aimed at the respective additional sensor windows 78 for the respective additional sensors 74. The pressure of the washer fluid exiting the nozzles 38, 90, 92 can dislodge or wash away obstructions that may impede the fields of view of the sensors 34, 62, 74.

The first reservoir 48 is a tank fillable with a first additive, e.g., an insect-removal additive. The first reservoir 48 is fixed relative to the primary reservoir 46. The first reservoir 48 may be disposed in a front of the vehicle 30, specifically, in an engine compartment forward of a passenger cabin. Alternatively, the first reservoir 48 may be disposed in the cavity 72 of the housing 70. In either location, the first reservoir 48 is positioned to supply additive to the primary supply line 40 via one of the additive supply lines 42.

The second reservoir 50 is a tank fillable with a second additive, e.g., an ice-removal additive. The second reservoir 50 is fixed relative to the primary reservoir 46. The second reservoir 50 may be disposed in a front of the vehicle 30, specifically, in an engine compartment forward of a passenger cabin. Alternatively, the second reservoir 50 may be disposed in the cavity 72 of the housing 70. In either location, the second reservoir 50 is positioned to supply additive to the primary supply line 40 via one of the additive supply lines 42.

The third reservoir 52 is a tank fillable with a third additive, e.g., a hydrophobic coating for the sensor windows 36, 76, 78. The third reservoir 52 is fixed relative to the primary reservoir 46. The third reservoir 52 may be disposed in a front of the vehicle 30, specifically, in an engine compartment forward of a passenger cabin. Alternatively, the third reservoir 52 may be disposed in the cavity 72 of the housing 70. In either location, the third reservoir 52 is positioned to supply additive to the primary supply line 40 via one of the additive supply lines 42.

The first, second, and third valves 54, 56, 58 are positioned to control flow through one of the additive supply lines 42, i.e., control whether or not additive from one of the first reservoir 48, second reservoir 50, or third reservoir 52 enters the primary supply line 40. The first valve 54 controls flow from the first reservoir 48 to the primary supply line 40, the second valve 56 controls flow from the second reservoir 50 to the primary supply line 40, and the third valve 58 controls flow from the third reservoir 52 to the primary supply line 40. The first, second, and third valves 54, 56, 58 are each actuatable between an open position permitting flow and a closed position blocking flow through the respective additive supply line 42. The first, second, and third valves 54, 56, 58 are independently actuatable, i.e., can each be actuated without actuating the others. The first, second, and third valves 54, 56, 58 can be, e.g., solenoid valves.

The first pump 82 is fluidly connected to the first reservoir 48, e.g., attached to or disposed in the first reservoir 48. The second pump 84 is fluidly connected to the second reservoir 50, e.g., attached to or disposed in the second reservoir 50. The third pump 86 is fluidly connected to the third reservoir 52, e.g., attached to or disposed in the third reservoir 52. The first, second, and third pumps 82, 84, 86 can force liquid from the respective of the first, second and third reservoirs 48, 50, 52 into the primary supply line 40 when the respective of the first, second, and third valves 54, 56, 58 is open.

Figure 3:
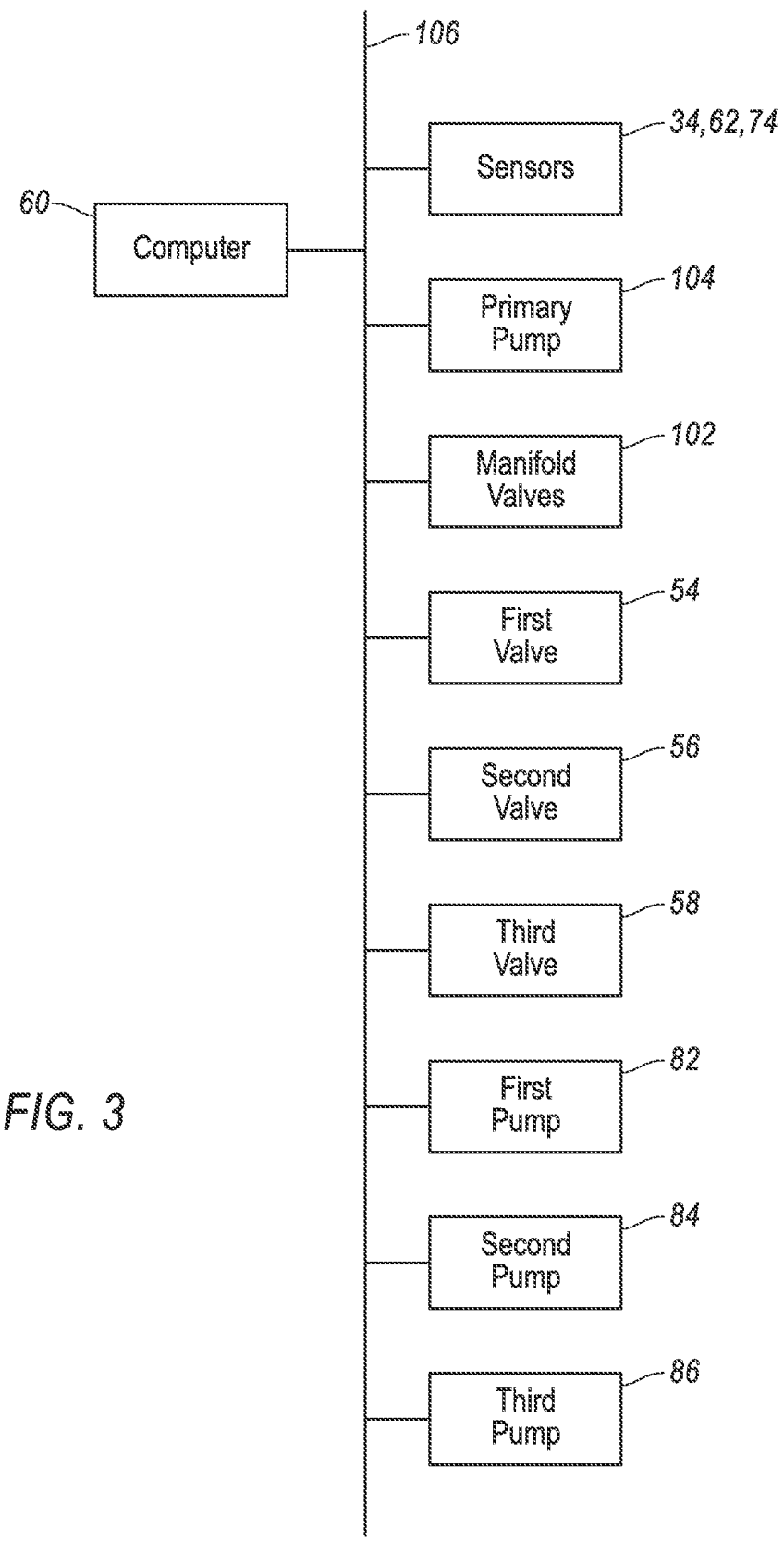
FIG. 3 is a block diagram of a control system for the cleaning system.

With reference to FIG. 3, the computer 60 is a microprocessor-based controller. The computer 60 includes a processor, a memory, etc. The memory of the computer 60 includes media for storing instructions executable by the processor as well as for electronically storing data and/or databases.

The computer 60 may transmit and receive data through a communications network 106 such as a controller area network (CAN) bus, Ethernet, WiFi, Local Interconnect Network (LIN), onboard diagnostics connector (OBD-II), and/or by any other wired or wireless communications network. The computer 60 may be communicatively coupled to the sensors 34, 62, 74, the primary pump 104, the manifold valves 102, the first valve 54, the second valve 56, the third valve 58, the first pump 82, the second pump 84, the third pump 86, and other components via the communications network 106.

FIG. 4 is a process flow diagram illustrating an exemplary process 400 for cleaning the sensor system 32. The memory of the computer 60 stores executable instructions for performing the steps of the process 400. As a general overview of the process 400, the computer 60 actuates the primary pump 104 to spray washer fluid in response to detecting an obstruction without a first condition or a second condition being satisfied, actuates the primary pump 104 along with the first pump 82 and first valve 54 in response to detecting an obstruction and the first condition being satisfied, actuates the primary pump 104 along with the second pump 84 and second valve 56 in response to detecting an obstruction and the second condition being satisfied, and actuate the primary pump 104 along with the third pump 86 and the third valve 58 in response to a third condition being satisfied while the vehicle 30 is stopped. As described in more detail below, the first condition can be detecting that an insect has impacted one of the sensor windows 36, 76, 78, the second condition can be ice buildup on one of the sensor windows 36, 76, 78, and the third condition can be loss of hydrophobic coating on one of the sensor windows 36, 76, 78. The process 400 runs continuously while the vehicle 30 is on.

The process 400 begins in a block 405, in which the computer 60 receives data from the sensors 34, 62, 74. The computer 60 receives, e.g., image data from each of the sensors 34, 62, 74 through the communications network 106. The data are a sequence of image frames of the field of view of each of the sensors 34, 62, 74. Each image frame is a two-dimensional matrix of pixels. Each pixel has a brightness or color represented as one or more numerical values, depending on the types of sensors 34, 62, 74. For example, if one of the sensors 34, 62, 74 is a monochrome camera, each pixel can be a scalar unitless value of photometric light intensity between 0 (black) and 1 (white). For another example, if one of the sensors 34, 62, 74 is a full-color camera, the pixels can be values for each of red, green, and blue, e.g., each on an 8-bit scale (0 to 255) or a 12- or 16-bit scale. Position in an image frame, i.e., position in the field of view of the respective sensors 34, 62, 74 at the time that the image frame was recorded, can be specified in pixel dimensions or coordinates, e.g., an ordered pair of pixel distances, such as a number of pixels from a top edge and a number of pixels from a left edge of the field of view. Alternatively, the data from the sensors 34, 62, 74 can be event-based vision, in which each pixel records independently of the other pixels when that pixel senses motion, thus recording more extensively about portions of the field of view experiencing change and recording less about portions of the field of view remaining static.

Next, in a decision block 410, the computer 60 determines whether an obstruction trigger has occurred. An "obstruction trigger" is any data received in the computer 60 that indicates that one of the sensor windows 36, 76, 78 should be cleaned. For example, the computer 60 may receive a user command to perform cleaning of one or more of the sensor windows 36, 76, 78 or of another component of the vehicle 30 such as a windshield. For another example, the computer 60 may determine that debris is on one of the sensor windows 36, 76, 78 based on data received from the respective sensor 34, 62, 74. For example, the computer 60 may determine, e.g., according to known image-analysis techniques, that a set of pixels in image data received from the respective sensor 34, 62, 74 is unchanging over time compared to the other of the pixels in the image data, suggesting that a portion of the field of view of that sensor 34, 62, 74 has been covered. Other algorithms may be used, e.g., classical computer vision or machine learning algorithms such as convolutional neural networks. In response to the lack of an obstruction trigger, the process 400 proceeds to a decision block 440. In response to an obstruction trigger, the process 400 proceeds to a decision block 415.

In the decision block 415, the computer 60 determines whether the first condition is satisfied based on the data from the sensor 34, 62, 74 for which the obstruction was detected. The first condition can be an impact to the respective sensor window 36, 76, 78 by an insect. Alternatively or more specifically, the first condition can be a presence of an insect on the respective sensor window 36, 76, 78 after washing that sensor window without actuating the first valve 54 and first pump 82, i.e., the computer 60 has performed a block 435 below at least once after detecting that an insect is on the respective sensor window 36, 76, 78. The computer 60 can determine that an obstruction is an insect by identifying the type of obstruction and determining whether the type of obstruction is insect or a different type. The computer 60 can identify the type of obstruction using conventional image-recognition techniques, e.g., a convolutional neural network programmed to accept images as input and output an identified type of obstruction. The types of obstructions can include, e.g., water, ice, dirt, mud, dust, insect, etc. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential type of obstruction, and the final output is the type of obstruction with the highest score. If the type of obstruction with the highest score is insect, then the first condition is satisfied. If the first condition is satisfied, the process 400 proceeds to a block 420. If the first condition is not satisfied, the process 400 proceeds to a decision block 425.

In the block 420, the computer 60 actuates the sensor system 32 to spray the respective sensor window 36, 76, 78 with washer fluid containing the first additive. The computer 60 actuates the primary pump 104 and actuates the manifold valve 102 corresponding to the respective sensor window 36, 76, 78 to open while the rest of the manifold valves 102 remain closed, thus routing fluid to the nozzle 38, 90, 92 corresponding to the sensor window 36, 76, 78, e.g., the first nozzle 38 if the first sensor window 36 is obstructed, the second nozzle 90 if the second sensor window 76 is obstructed, etc. The computer 60 also actuates the first pump 82 and the first valve 54 to mix the first additive into the washer fluid being sent to the sensor window 36, 76, 78. The computer 60 can mix in a preset quantity of the first additive, e.g., by actuating the first valve 54 to be open for a preset time and then actuating the first valve 54 to close. The preset quantity can be chosen by experimenting to determine a minimal quantity that is effective at removing an insect from one of the sensor windows 36, 76, 78. After the block 420, the process 400 proceeds to a decision block 455.

In the decision block 425, the computer 60 determines whether the second condition is satisfied based on the data from the sensor 34, 62, 74 for which the obstruction was detected. The second condition can be ice buildup, e.g., frost, on the sensor window 36, 76, 78. The computer 60 can determine that an obstruction is ice by using the identification of the type of obstruction from the decision block 415 above and determining whether the type of obstruction is ice or a different type. If the second condition is satisfied, the process 400 proceeds to a block 430. If the second condition is not satisfied, the process 400 proceeds to the block 435.

In the block 430, the computer 60 actuates the sensor system 32 to spray the respective sensor window 36, 76, 78 with washer fluid containing the second additive. The computer 60 actuates the primary pump 104 and actuates the manifold valve 102 corresponding to the respective sensor window 36, 76, 78 to open while the rest of the manifold valves 102 remain closed, thus routing fluid to the nozzle 38, 90, 92 corresponding to the sensor window 36, 76, 78, e.g., the first nozzle 38 if the first sensor window 36 is obstructed, the second nozzle 90 if the second sensor window 76 is obstructed, etc. The computer 60 also actuates the second pump 84 and the second valve 56 to mix the second additive into the washer fluid being sent to the sensor window 36, 76, 78. The computer 60 can mix in a preset quantity of the second additive, e.g., by actuating the second valve 56 to be open for a preset time and then actuating the second valve 56 to close. The preset quantity can be chosen by experimenting to determine a minimal quantity that is effective at removing ice buildup from one of the sensor windows 36, 76, 78. After the block 430, the process 400 proceeds to the decision block 455.

In the block 435, the computer 60 actuates the sensor system 32 to spray the respective sensor window 36, 76, 78 with washer fluid containing none of the additives. The computer 60 actuates the primary pump 104 and actuates the manifold valve 102 corresponding to the respective sensor window 36, 76, 78 to open while the rest of the manifold valves 102 remain closed, thus routing fluid to the nozzle 38, 90, 92 corresponding to the sensor window 36, 76, 78, e.g., the first nozzle 38 if the first sensor window 36 is obstructed, the second nozzle 90 if the second sensor window 76 is obstructed, etc. The computer 60 refrains from actuating the first valve 54, second valve 56, and third valve 58, leaving them closed. After the block 435, the process 400 proceeds to the decision block 455.

In the decision block 440, the computer 60 determines whether the third condition is satisfied for each of the sensor windows 36, 76, 78 based on the data from the respective sensors 34, 62, 74. The third condition is a loss of hydrophobic coating on the respective sensor window. The computer 60 can determine that a loss of hydrophobic coating has occurred by measuring a proxy for the quantity, e.g., thickness, of hydrophobic coating on the sensor window and determining whether that proxy has crossed a threshold. For example, the computer 60 can determine whether the transmission haze of each sensor window 36, 76, 78 is above a haze threshold. Transmission haze is the proportion of light passing through a transparent material that is subject to wide-angle scattering, i.e., scattering at an angle greater than 2.5° from normal, according to the ASTM D1003 testing standard. For another example, the proxy could be a measurement of some aspect of water droplets appearing on the sensor window 36, 76, 78. Examples of measurements of water droplets include distortion value, contact angle, size, transparency, distribution, luminosity gradient, etc., as disclosed in more detail in U.S. patent application Ser. No. 16/253,851, which is hereby incorporated by reference. If the third condition is satisfied, the process 400 proceeds to a decision block 445. If the third condition is not satisfied, the process 400 proceeds to the decision block 455.

In the decision block 445, the computer 60 determines whether the vehicle 30 has come to a stop and/or whether the vehicle 30 will be stopped for at least a preset duration. The preset duration can be chosen to provide sufficient time for additional hydrophobic coating to be applied and to set, as described below with respect to a block 450. For example, if the vehicle 30 is an autonomous vehicle, the computer 60 can determine whether the next trip that the vehicle 30 will take will not begin for at least the preset duration, e.g., by consulting a schedule of upcoming trips stored in the memory of the computer 60. If the vehicle 30 is stopped or stopped for at least the preset duration, the process 400 proceeds to the block 450. If the vehicle 30 is not stopped or will not be stopped for at least the preset duration, the process 400 proceeds to the decision block 455.

In the block 450, the computer 60 actuates the sensor system 32 to spray the sensor window 36, 76, 78 that satisfies the third condition with washer fluid containing the third additive. The computer 60 actuates the primary pump 104 and actuates the manifold valve 102 corresponding to that sensor window 36, 76, 78 to open while the rest of the manifold valves 102 remain closed, thus routing fluid to the nozzle 38, 90, 92 corresponding to the sensor window 36, 76, 78, e.g., the first nozzle 38 if the first sensor window 36 has lost hydrophobic coating, the second nozzle 90 if the second sensor window 76 has lost hydrophobic coating, etc. The computer 60 also actuates the third pump 86 and the third valve 58 to mix the second additive into the washer fluid being sent to the sensor window. The computer 60 can mix in a preset quantity of the third additive, e.g., by actuating the third valve 58 to be open for a preset time and then actuating the third valve 58 to close. The preset quantity can be chosen by experimenting to determine a quantity that replenishes the hydrophobic coating. After the block 450, the process 400 proceeds to the decision block 455.

In the decision block 455, the computer 60 determines whether the vehicle 30 is on. If the vehicle 30 is on, the process 400 returns to the block 405 to continue monitoring the sensor data. If the vehicle 30 is off, the process 400 ends. In other words, the process 400 runs continuously while the vehicle 30 is on.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first," "second," and "third" are used throughout this document as identifiers and are not intended to signify importance, order, or quantity. "Substantially" as used herein means that a dimension, time duration, shape, or other adjective may vary slightly from what is described due to physical imperfections, power interruptions, variations in machining or other manufacturing, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A sensor system comprising:
   a sensor including a sensor window;
   a nozzle aimed at the sensor window;
   a supply line positioned to supply fluid to the nozzle;
   a primary reservoir positioned to supply fluid to the supply line;
   a first reservoir, a second reservoir, and a third reservoir, all fixed relative to the primary reservoir;
   a first valve actuatable to inject fluid from the first reservoir into the supply line;
   a second valve actuatable to inject fluid from the second reservoir into the supply line;
   a third valve actuatable to inject fluid from the third reservoir into the supply line; and
   a computer communicatively coupled to the sensor and the valves, wherein the computer is programmed to
      actuate the first valve in response to determining a first condition based on data from the sensor;
      actuate the second valve in response to determining a second condition based on data from the sensor; and
      actuate the third valve in response to determining a third condition based on data from the sensor.

2. The sensor system of claim 1, wherein the valves are solenoid valves.

3. The sensor system of claim 1, wherein the first condition is an impact to the sensor window by an insect.

4. The sensor system of claim 1, wherein the first condition is a presence of an insect on the sensor window after washing the sensor window without actuating the first valve.

5. The sensor system of claim 1, wherein the second condition is ice buildup on the sensor window.

6. The sensor system of claim 1, wherein the third condition is a loss of hydrophobic coating on the sensor window.

7. The sensor system of claim 1, wherein the third condition is both a vehicle including the sensor coming to a stop and a loss of hydrophobic coating on the sensor window.

8. The sensor system of claim 1, wherein
the sensor is a first sensor;
the sensor window is a first sensor window; and
the nozzle is a first nozzle;
the sensor system further comprising a second sensor including a second sensor window;
a second nozzle aimed at the second sensor window; and
a manifold fluidly connected to the supply line, to the first nozzle, and to the second nozzle;
wherein the manifold includes manifold valves independently operable to output fluid from the supply line respectively to the first nozzle and to the second nozzle.

9. The sensor system of claim 8, wherein the computer is further programmed to:
in response to determining the first condition based on data from the second sensor, actuate the manifold valves to route fluid to the second nozzle and actuate the first valve;
in response to determining the second condition based on data from the second sensor, actuate the manifold valves to route fluid to the second nozzle and actuate the second valve; and
in response to determining the third condition based on data from the second sensor, actuate the manifold valves to route fluid to the second nozzle and actuate the third valve.

10. A computer comprising a processor and a memory storing instructions executable by the processor to:
actuate a first valve to inject a first additive to fluid supplied to a sensor window in response to determining a first condition based on data from a sensor including the sensor window;
actuate a second valve to inject a second additive to the fluid in response to determining a second condition based on data from the same sensor; and
actuate a third valve to inject a third additive to the fluid in response to determining a third condition based on data from the same sensor;
wherein the first condition, the second condition, and the third condition are different from each other.

11. The computer of claim 10, wherein the first condition is an impact to the sensor window by an insect.

12. The computer of claim 10, wherein the first condition is a presence of an insect on the sensor window after washing the sensor window without actuating the first valve.

13. The computer of claim 10, wherein the second condition is ice buildup on the sensor window.

14. The computer of claim 10, wherein the third condition is a loss of hydrophobic coating on the sensor window.

15. The computer of claim 10, wherein the third condition is both a vehicle including the sensor coming to a stop and a loss of hydrophobic coating on the sensor window.

16. A sensor system comprising:
a sensor including a sensor window;
means for cleaning the sensor window with fluid;
means for injecting a first additive into the fluid in response to determining a first condition based on data from the sensor;
means for injecting a second additive into the fluid in response to determining a second condition based on data from the same sensor; and
means for injecting a third additive into the fluid in response to determining a third condition based on data from the same sensor;
wherein the first condition, the second condition, and the third condition are different from each other.

17. The sensor system of claim 16, wherein the sensor is a first sensor, the sensor window is a first sensor window, the sensor system further comprising a second sensor including a second sensor window, and means to selectively direct the fluid to the first sensor window or the second sensor window.

18. The sensor system of claim 16, wherein the first additive, the second additive, and the third additive are different from each other.

19. The sensor system of claim 16, wherein the means for injecting the first additive is means for injecting the first additive from a first reservoir, the means for injecting the second additive is means for injecting the second additive from a second reservoir, and the means for injecting the third additive is means for injecting the third additive from a third reservoir.

* * * * *